United States Patent
Yeh (10) Patent No.: US 9,225,193 B2
(45) Date of Patent: Dec. 29, 2015

(54) ELECTRONIC DEVICE WITH AUTOMATIC POSITIONING FUNCTION

(71) Applicant: Ming-Hsiang Yeh, Taipei (TW)

(72) Inventor: Ming-Hsiang Yeh, Taipei (TW)

( * ) Notice: Subject to any disclaimer, the term of this patent is extended or adjusted under 35 U.S.C. 154(b) by 385 days.

(21) Appl. No.: 13/775,329

(22) Filed: Feb. 25, 2013

(65) Prior Publication Data

US 2013/0249308 A1    Sep. 26, 2013

(30) Foreign Application Priority Data

Mar. 23, 2012 (TW) ............... 101205277 U (51) Int. Cl.
| | |
|---|---|
| H02J 7/00 | (2006.01) |
| H02J 7/02 | (2006.01) |
| H01F 38/14 | (2006.01) |
| H02J 5/00 | (2006.01) |

(52) U.S. Cl.
CPC ............. *H02J 7/025* (2013.01); *H01F 38/14* (2013.01); *H02J 5/005* (2013.01)

(58) Field of Classification Search
CPC .................................. H02J 5/005; H02J 7/025
USPC .................................. 307/104; 320/107–108
See application file for complete search history.

(56) References Cited

U.S. PATENT DOCUMENTS

2012/0235636 A1*  9/2012  Partovi ............... 320/108

* cited by examiner

*Primary Examiner* — Paul Dinh
(74) *Attorney, Agent, or Firm* — Bacon & Thomas, PLLC (57) ABSTRACT

The present invention provides an electronic device with automatic positioning function, which includes a device body and a magnetic unit. The device body contains therein a wireless transmission module. The wireless transmission module includes a transmission coil. The device body has one side in which a receiving section is formed. The transmission coil is received in the receiving section. The transmission coil has an outer circumference that is spaced from an inner circumference of the receiving section by a movement distance. The magnetic unit is set at the center of the transmission coil.

10 Claims, 9 Drawing Sheets

ELECTRONIC DEVICE WITH AUTOMATIC POSITIONING FUNCTION

FIELD OF THE INVENTION

The present invention relates to an electronic device, and in particular to an electronic device with automatic positioning function that enables unidirectional or bidirectional wireless charging and also enables automatic movement and positioning through attraction.

BACKGROUND OF THE INVENTION

A regular electronic device (such as a mobile electronic device) uses a transceiver circuit module to effect wireless receipt and wireless transmission in performing wireless charging or discharging, so as to allow a first electronic device to transmit wirelessly electrical power to a second electronic device in which the electrical power is stored (namely, the first electronic device discharging electrical power and the second electronic device being electrically charged) to effect unidirectional wireless electrical charging. Oppositely, the two electronic devices may carry out wireless transmission of electrical power in the reversed direction (namely, the second electronic device discharging electrical power and the first electronic device being electrically charged) to provide bidirectional wireless charging. There is always power loss in wireless transmission of electrical power, to ensure the best wireless charging efficiency, precise alignment between two transceiver modules is a key factor.

Figure 2:
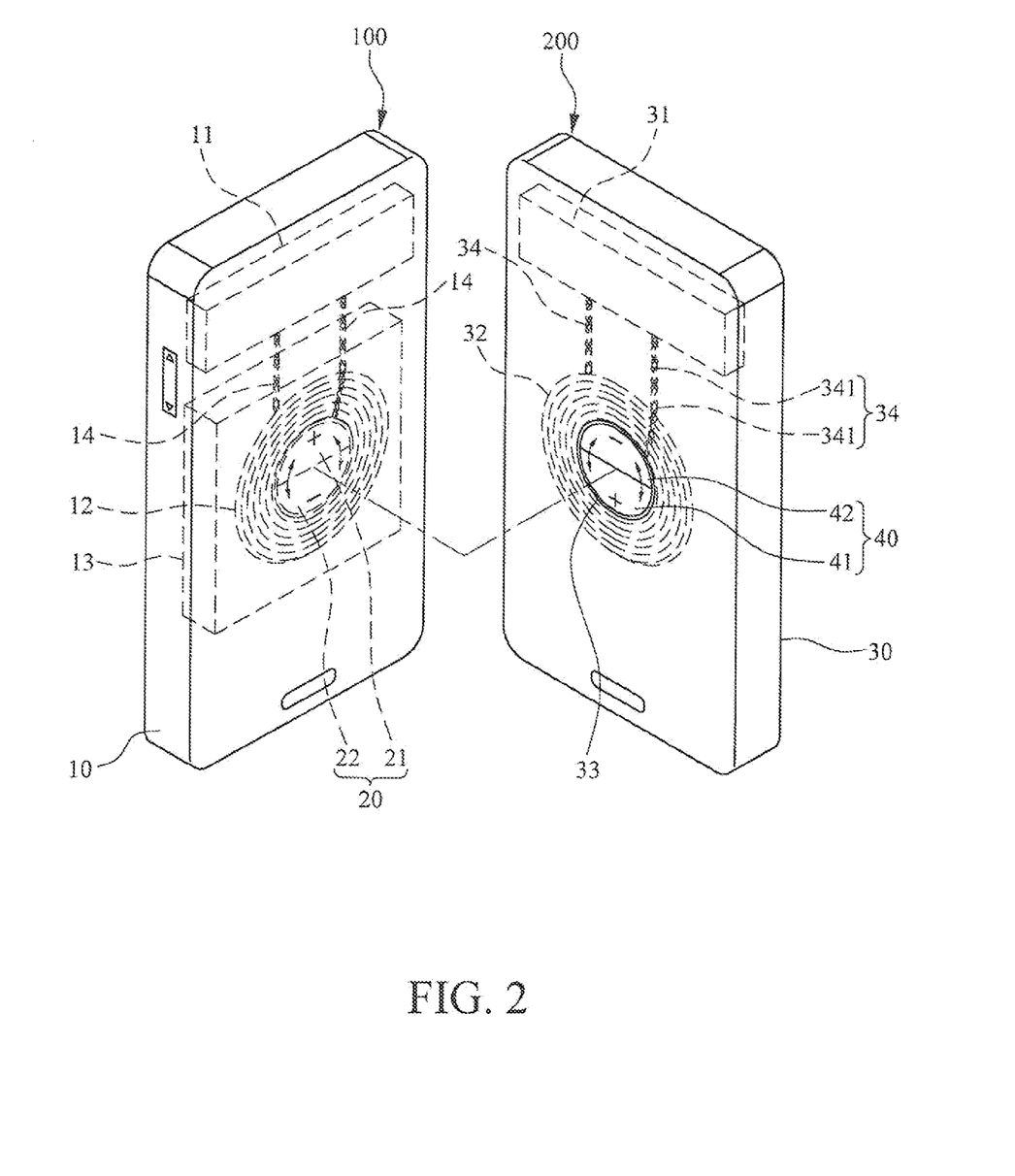
FIG. 2 is a perspective view showing the electronic device of FIG. 1 used in combination with another electronic device.

A conventional positioning structure of electronic device is exemplified by an electronic device 200 shown in the right-hand side portion of FIG. 2, which comprises a device body 30 having an outer surface in which a receiving section 33 (such as a recess) is formed. The receiving section 33 receives a magnetic unit 40 embedded therein. The magnetic unit 40 comprises a first magnetic attraction element 41 having positive pole facing outward and a second magnetic attraction element 42 having negative pole facing outward and is rotatable in the receiving section 33. As such, when the electronic device 200 is a mobile electronic device and is positioned on another structurally-identical electronic device (not shown), the magnetic units of the two electronic devices can be set to align with each other to allow the magnetic attraction elements of the electronic devices to rotate for magnetically attracting each other thereby achieving the effect of positioning.

However, the magnetic units 40 of the two electronic devices 200 are set at fixed positions, whereby when the two electronic devices 200 are not set in alignment with each other, the magnetic units 40 are constrained in position and cannot freely move so that the two magnetic units 40 cannot get close to each other. This prevents transmission coils 32 of the two electronic devices 200 from properly aligning with each other to correspond to each other. Consequently, power loss may easily occur in transmitting electrical power.

Thus, the present invention aims to provide an electronic device with automatic positioning function, which is applicable to unidirectional wireless electrical charging or bidirectional wireless electrical charging/discharging to improve convenience and easiness of use.

SUMMARY OF THE INVENTION

The primary object of the present invention is to provide an electronic device with automatic positioning function, which uses the nature of magnetic units that identical polarities expel each other while opposite polarities attract each other and enables automatic rotation, self-moving, positioning through attraction, and improved resistance to stretching to provide the functions of magnetic polarity switching for wide applications to different types of devices for achieving unidirectional wireless electrical charging and bidirectional wireless electrical charging/discharging without the need of careful arrangement for properly aligning two electronic devices or setting one of the two electronic devices in an oppositely positioned condition, making the use thereof easy and convenient.

To achieve the object, the present invention provides an electronic device with automatic positioning function, which comprises a device body that contains therein a wireless transmission module. The wireless transmission module comprises a transmission coil. The device body has one side in which a receiving section is formed. The transmission coil is received in the receiving section. The transmission coil has an outer circumference that is spaced from an inner circumference of the receiving section by a movement distance. A magnetic unit is set at the center of the transmission coil. As such, efficacies of automatic rotation, self-moving, positioning through attraction, and resistance against stretching can be realized. Also, an efficacy of switchability of magnetic polarities is provided to increase the types of devices to which the invention is applicable for effecting unidirectional wireless electrical charging and bidirectional wireless charging/discharging. Further, it is not necessary to exercise special care for precise alignment between two electronic devices in making electrical charging and there is no need to place one of two electronic devices up-side-down so that the use is convenient and easy.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 8:
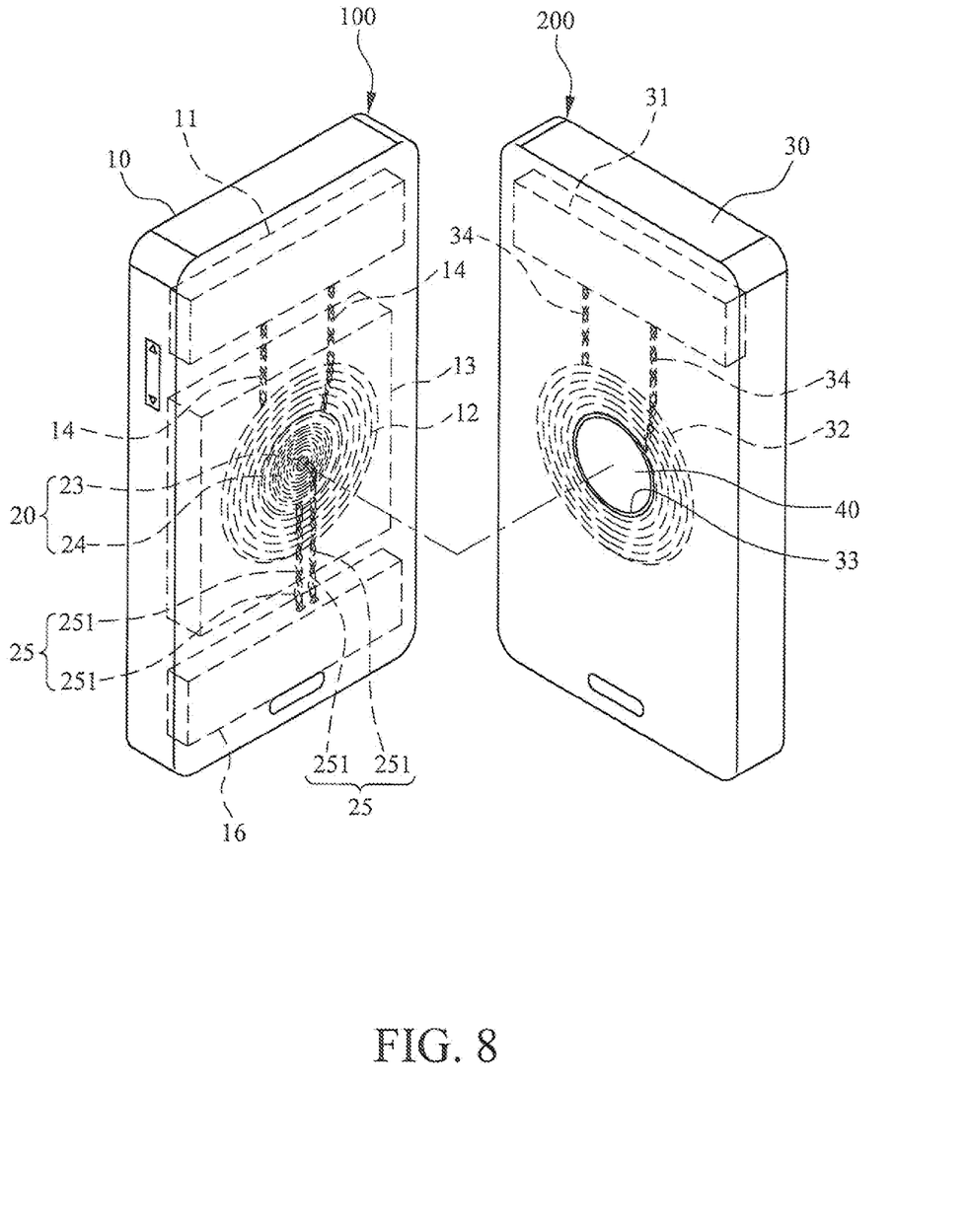
FIG. 8 is a perspective view showing the magnetic unit of FIG. 2 replaced by a magnetism conduction member in combination with an electromagnetic coil.
Figure 9:
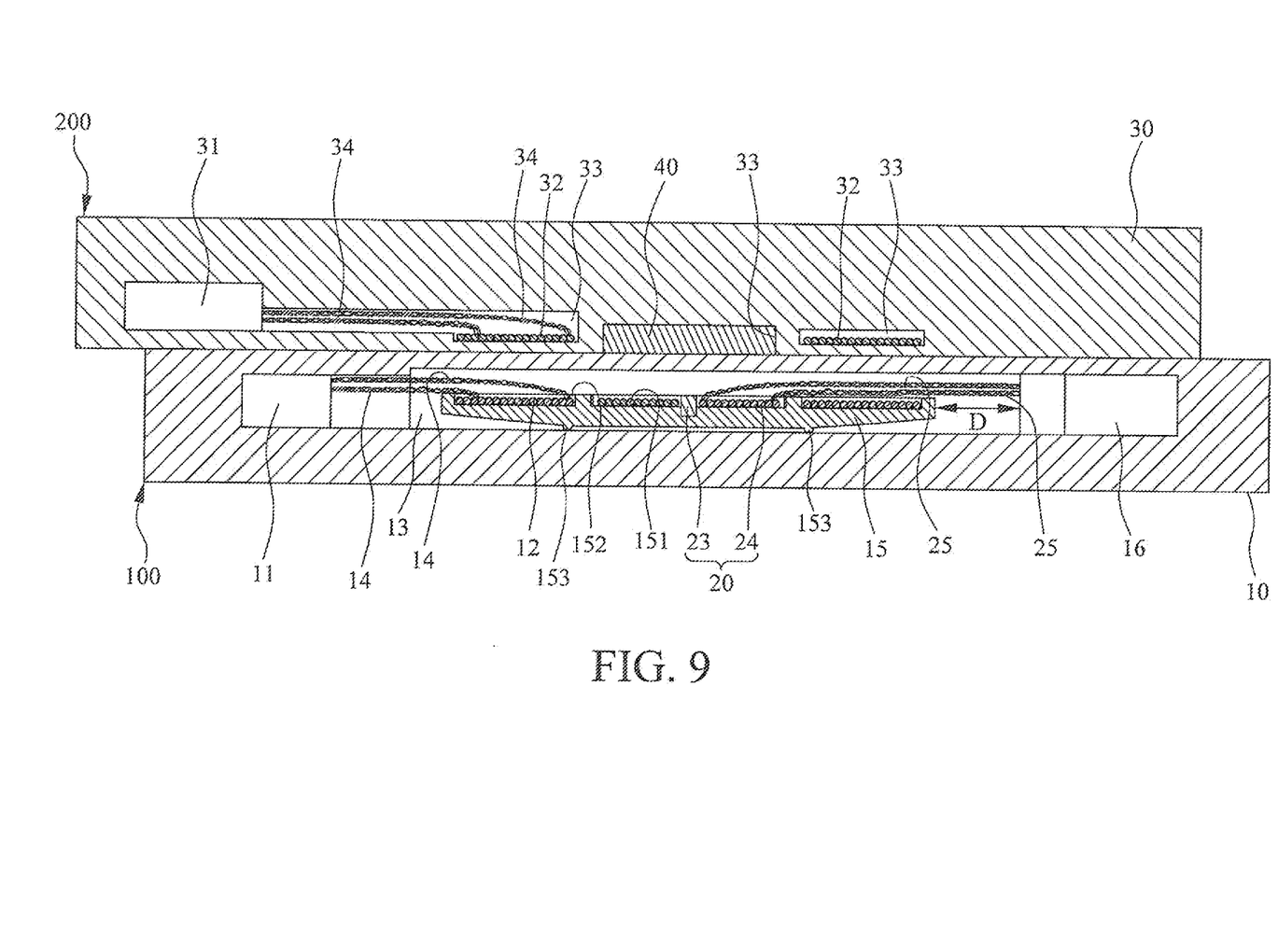
FIG. 9 is a cross-sectional view showing the electronic device of FIG. 8 used in combination with another electronic device.

The present invention provides an electronic device with automatic positioning function. Illustrated in FIGS. 1-7 is an electronic device according to the present invention, which comprises two magnetic attraction elements serving as an exemplary magnetic unit, wherein FIGS. 4-7 respectively illustrate first, second, third, and fourth embodiments of the electronic device according to the present invention that is further provided with a disk for use in combination with the magnetic unit and a transmission coil. Further, illustrated in FIGS. 8 and 9 is an electronic device according to the present invention in which an electromagnetic coil is used in combination with a magnetism conduction member to serve as an exemplary magnetic unit.

Figure 1:
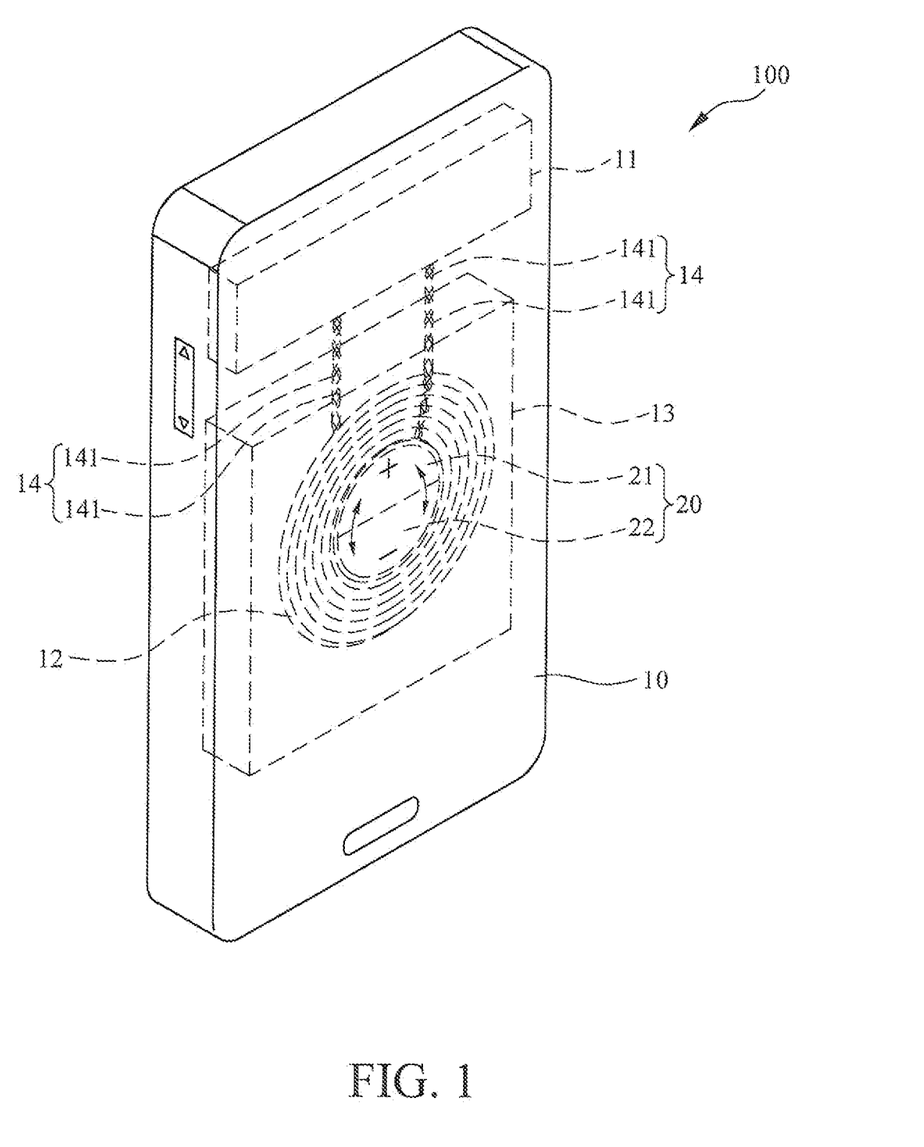
FIG. 1 is a perspective view showing an electronic device with automatic positioning function according to the present invention.
Figure 3:
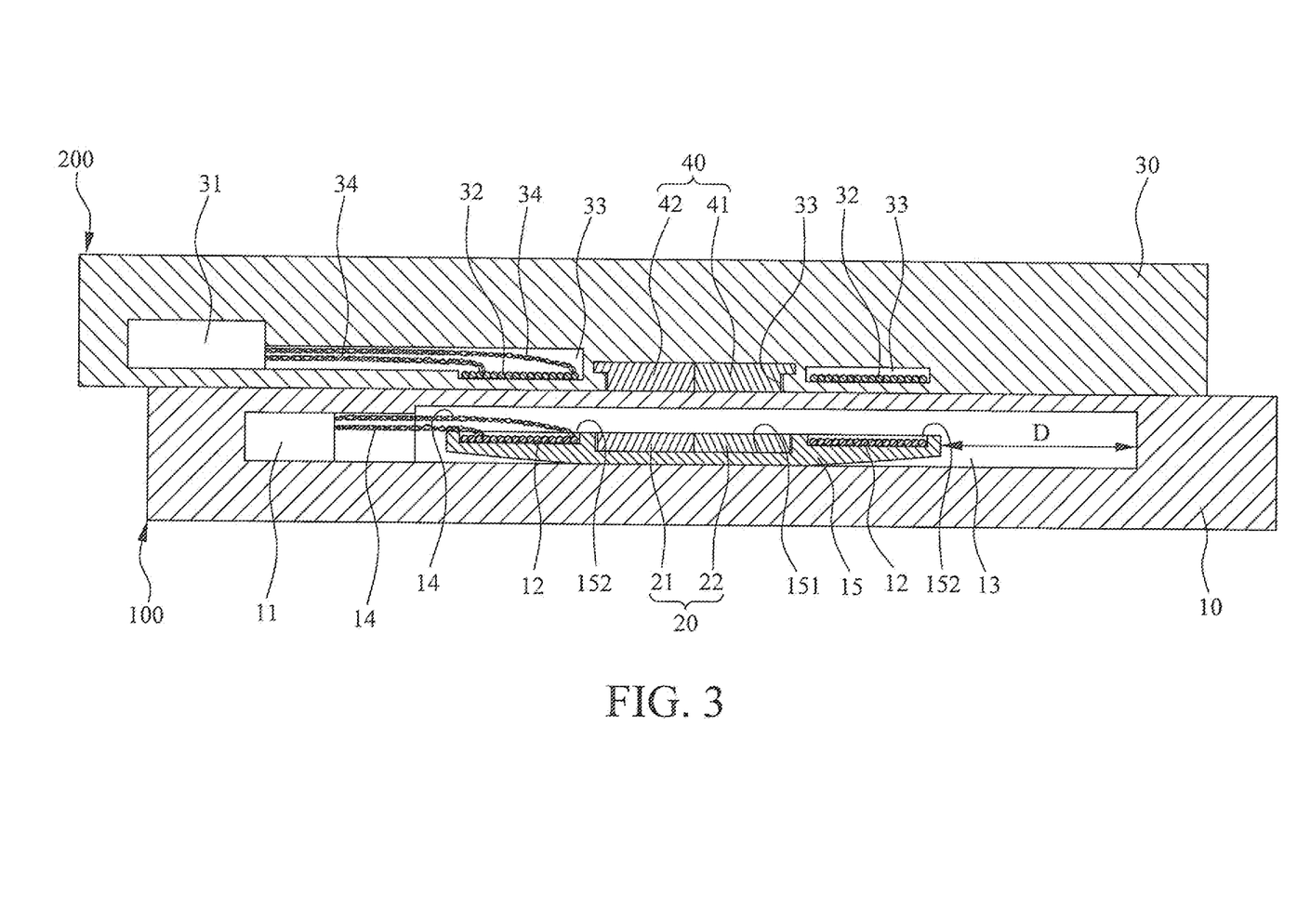
FIG. 3 is a cross-sectional view showing the electronic device used in combination with another electronic device shown in FIG. 2.

Referring to FIGS. 1, 2, and 3, the present invention provides an electronic device, generally designated at 100, comprising a device body 10 and a magnetic unit 20.

The device body 10 contains therein a wireless transmission module 11. The wireless transmission module 11 comprises a transmission coil 12, which enables wireless transmission. Further, the device body 10 comprises a receiving section 13 formed in a one side thereof. The transmission coil 12 is received in the receiving section 13. Further, the transmission coil 12 has an outer circumference that is spaced from an inner circumference of the receiving section 13 by a movement distance D. The magnetic unit 20 is set at a center of the transmission coil 12. As shown in the drawings, the receiving section 13 is formed in a back side of the device body 100. However, the present invention is not limited to such an arrangement of the receiving section in the back side. The magnetic unit 20 and the transmission coil 12 may, based on the type of the device body 10, alternatively be formed in a circumferential side or a front side of the device body 10 in order to provide effectiveness of protection and aesthetics.

In the above discussion, the wireless transmission module 11 and the transmission coil 12 are connected to each other by at least two first conductive wires 14 arranged therebetween. Each of the first conductive wires 14 is formed by twisting multiple strands of threads 141 so as to improve the structural strength of the first conductive wires 14 and to provide effectiveness of stretching resistance. The above mentioned multiple strands of threads 141 can be all metal threads (such as copper wires), or a combination of some metal threads and some non-metal threads (such as nylon threads), or one metal thread in combination with the remaining non-metal threads. Preferably, the threads are all metal threads so that when a fraction of the threads is broken, electrical connection may be maintained to ensure the function of wireless transmission.

Further, the receiving section 13 of the device body 10 movably receives therein a disk 15. The disk 15 has a surface forming a central receiving chamber 151 and a circumferential receiving chamber 152 that circumferentially surrounds the central receiving chamber 151. The central receiving chamber 151 carries therein the magnetic unit 20. The circumferential receiving chamber 152 carries the transmission coil 12. As such, the magnetic unit 20 and the transmission coil 12 are retained together and are movable in unison with each other. The disk 15 can be made of a plastic material to provide the advantages of insulation, lightweight, and low friction, making it possible to slide and reduce interference with transmission.

The magnetic unit 20 comprises a first magnetic attraction element 21 having positive polarity facing outward and a second magnetic attraction element 22 having negative polarity facing outward. The first and second magnetic attraction elements 21, 22 are laid flat and jointed to each other to form a shape of disk. The magnetic unit 20 is rotatably received in the central receiving chamber 151 of the disk 15. The first and second magnetic attraction elements 21, 22 are made as first and second magnets that are halves of a circular disk shape.

The electronic device 100 according to the present invention, which is formed by assembling the above discussed components/parts, can be used to carry out wireless electrical charging and/or discharging with respect to another electronic device 200. As shown in FIG. 3, the two electronic devices 100, 200 can both serve as the transmitting side and the receiving side without one of the electronic devices being placed in an up-side-down manner. This is because in the present invention, the magnetic unit 20 is in a free-to-rotate condition and is allowed to automatically rotate due to the characteristics of identical polarities expelling each other and opposite polarities attracting each other thereby making the first magnetic attraction element 21 of one electronic device 100 attracting and attached to the second magnetic attraction element 42 of the other one electronic device 200 and the second magnetic attraction element 22 of said one electronic device 100 attracting and attached to the first magnetic attraction element 41 of said other one electronic device 200 for mutually positioning (namely the magnetic units 20 being capable of automatic rotation for attraction and positioning) so that the wireless transmission modules of the two electronic devices 100, 200 may be set in precise alignment with each other to ensure the best wireless charging/discharging efficiency.

Further, as shown in FIG. 3, the device body 30 of said other one electronic device 200 comprises a plurality of receiving sections 33 for receiving and retaining the transmission coil 32 of the wireless transmission module 31 and the magnetic unit 40 thereof. This makes it impossible for the transmission coil 32 and the magnetic unit 40 to move within the receiving sections 33 of the device body 30. Under this condition, the magnetic unit 20 adopted in the present invention is allowed to move in unison with the transmission coil 12 and the disk 15, so that when the device body 30 of said other one electronic device 200 is positioned on the device body 10 of the electronic device 100 according to the present invention, there is no need to exercise care for precise alignment and no additional concern about the weight of any one of the electronic devices needs to be exercised (for example said other one electronic device 200 being excessively heavy and not movable by magnetic attraction). The magnetic unit 20 received in the receiving section 13 of the device body 10 according to the present invention may induce magnetic attraction with respect to the magnetic unit 40 of said other one electronic device 200 to cause the magnetic unit 20 to automatically carry the transmission coil 12 to move a movement distance D so as to allow the magnetic unit 20 to be set at an alignment position (where the first and second magnetic attraction elements 21, 22 of the magnetic unit 20 undergo automatic rotation to respectively attract the first and second magnetic attraction elements 41, 42 of said other one electronic device 200), whereby the transmission coil 12 of the present invention may carry out wires transmission with respect to the transmission coil 32 of the wireless transmission module 31 of said other one electronic device 200.

Further, exemplary arrangements are provided for the magnetic unit 20 and the disk 15 as discussed in the following embodiments:

First Embodiment

Figure 4:
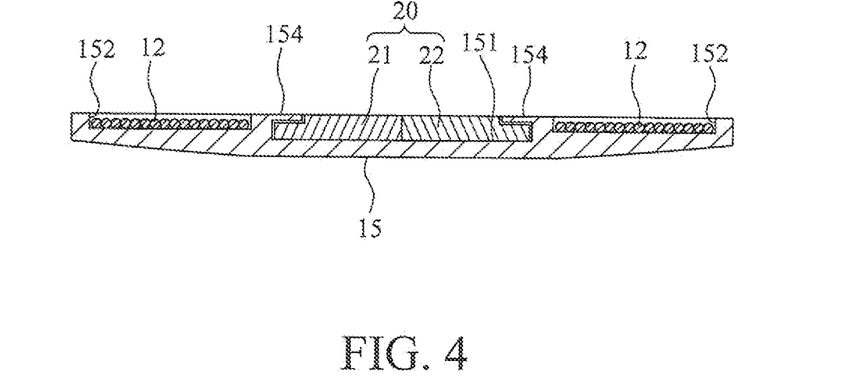
FIG. 4 is a view showing a first embodiment of a combination of a disk with a magnetic unit and a transmission coil according to the present invention.

As shown in FIG. 4, the central receiving chamber 151 of the disk 15 comprises an annulus of projecting flange 154 along a circumference thereof. The projecting flange 154 constrains the magnetic unit 20 within the central receiving chamber 151. In this way, the magnetic unit 20 is prohibited from separating from the disk 15.

Second Embodiment

Figure 5:
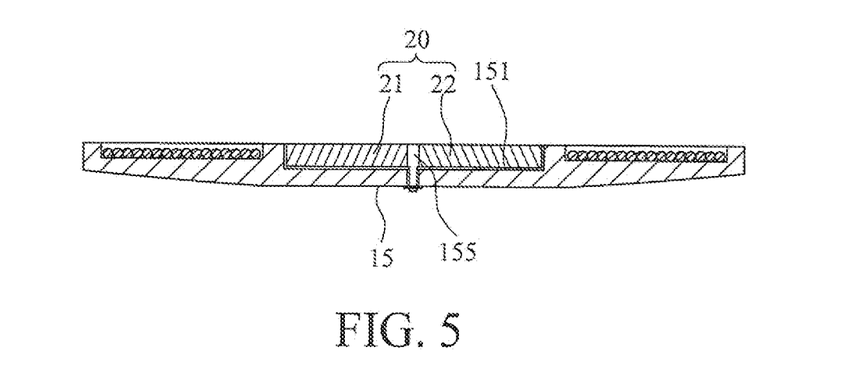
FIG. 5 is a view showing a second embodiment of a combination of a disk with a magnetic unit and a transmission coil according to the present invention.

As shown in FIG. 5, the second embodiment of the present invention is different from the first embodiment in that the central receiving chamber 151 of the disk 15 receives a vertically extending and freely rotatable rotation shaft 155 arranged therein. The rotation shaft 155 is fixedly fit into a center of the magnetic unit 20 (such as the center of a circular disk shaped magnetic unit 20). The rotation shaft 155 is freely rotatable within the central receiving chamber 151. The magnetic unit 20 is driven by the rotation shaft 155 to rotate in unison with the rotation shaft 155 so as to achieve the purposes of automatic rotation and attraction for positioning. Further, the projecting flange 154 shown in FIG. 4 can be omitted from the central receiving chamber 151 because the magnetic unit 20 is already retained in the central receiving chamber 151.

Third Embodiment

Figure 6:
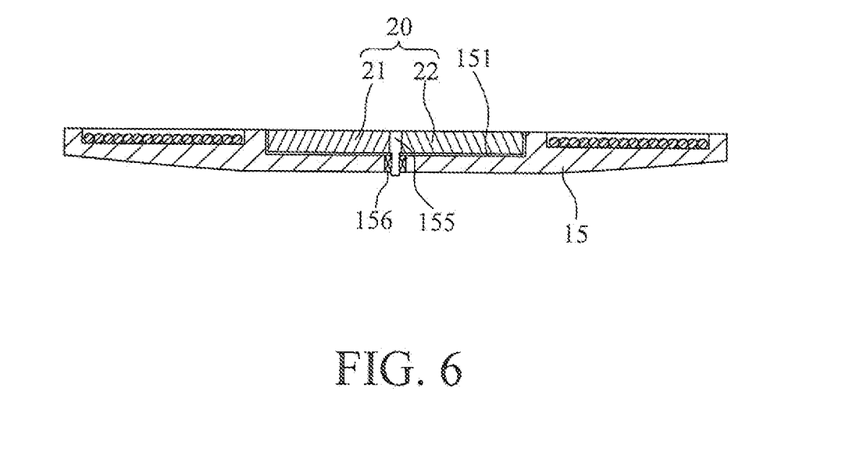
FIG. 6 is a view showing a third embodiment of a combination of a disk with a magnetic unit and a transmission coil according to the present invention.

As shown in FIG. 6, the second embodiment of the present is different from the above discussed first and second embodiments in that the central receiving chamber 151 of the disk 15 comprises a bearing 156 fit therein. An end of the rotation shaft 155 is vertically fit into the bearing 156 for free rotation. An opposite end of the rotation shaft 155 is fixedly fit into the center of the magnetic unit 20 (such as the center of a circular disk shaped magnetic unit 20), so that the magnetic unit 20 is rotatable in unison with the rotation shaft 155 to achieve the purposes of automatic rotation and attraction for positioning. Further, the projecting flange 154 shown in FIG. 4 can be omitted from the central receiving chamber 151 because the magnetic unit 20 is already fixed to the rotation shaft 155.

Fourth Embodiment

Figure 7:
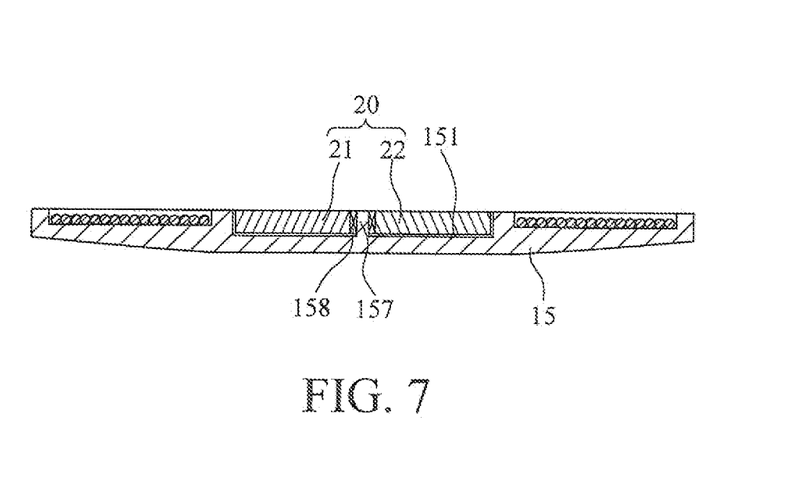
FIG. 7 is a view showing a fourth embodiment of a combination of a disk with a magnetic unit and a transmission coil according to the present invention.

As shown in FIG. 7, the second embodiment of the present is different from the above discussed first, second, and third embodiments in that the central receiving chamber 151 of the disk 15 comprises a vertically extending raised post 157. A bearing 158 is set at the center of the magnetic unit 20 (such as the center of a circular disk shaped magnetic unit 20), so that the magnetic unit 20 is fit via the bearing 158 to the raised post 157 to allow the magnetic unit 20 to freely rotate thereby achieving the purposes of automatic rotation and attraction for positioning. Further, the projecting flange 154 shown in FIG. 4 can be omitted from the central receiving chamber 151 because the magnetic unit 20 is already securely fit to the raised post 157 by the bearing 158.

Referring to FIGS. 8 and 9, a different electronic device 100 according to the present invention is shown, of which the differences is that the magnetic unit 20 comprises a magnetism conduction member 23 and an electromagnetic coil 24. The electromagnetic coil 24 is wound around the magnetism conduction member 23 and is fixed together inside the central receiving chamber 151 of the disk 15. The electromagnetic coil 24 is connected to two second conductive wires 25. Each of the second conductive wires 25 is formed by twisting multiple strands of threads 251 so as to improve the structural strength of the second conductive wires 25 and to provide effectiveness of stretching resistance and also to maintain electrical connection even after some of the threads break to still allow the magnetic unit 20 to generate magnetic attraction for facilitating subsequent operation of wire transmission. The two second conductive wires 25 are electrically connected to an internal power supply 16 of the device body 10 (such as a control circuit board) to supply electrical power to induce magnetic polarity of the electromagnetic coil 24 for affecting magnetism of the magnetism conduction member 23 so as to achieve the purposes of magnetic attraction for positioning.

To facilitate sliding movement and reduce frictional resistance against surfaces of the receiving section 13, the disk 15 is provided with a curved face on a surface thereof but is not limited to such an arrangement. As shown in FIG. 9, the disk 15 may alternatively be provided on an opposite surface thereof with a plurality of spot bumps 153. These spot bumps 153 provide slidable engagement with the surface of the receiving section 13.

The magnetic unit 20 may achieve switching of magnetic polarities by means of the magnetism conduction member 23 in combination with the electromagnetic coil 24, together with variation of direction of electrical current flowing through the two second conductive wires 25, in order to work with the magnetic unit 40 of another electronic device 200 to provide easiness and convenience of use. Further, as shown in FIG. 9, after the magnetic unit 20 (namely the magnetism conduction member 23 and the electromagnetic coil 24) automatically moves the transmission coil 12 to a desired position, the supply of electrical power is cut off in order to reduce interference with wireless transmission effected between the two electronic devices 100, 200. In FIG. 9, the magnetic unit 40 of said another electronic device 200 may also adopt the arrangement of the magnetism conduction member in combination with the electromagnetic coil. The magnetism conduction member can be a bar, a block, or a ring made of magnetic materials.

In each of the above discussed examples and embodiments of the present invention, the electronic device 100, 200 can be a mobile electronic device (such as a mobile phone, a notebook computer, a tablet computer, and a digital camera), an electrically operated device (such as a power tool), a power supply device, or a wireless charging device that simply transmit electrical power in a wireless manner (such as when an automobile drivers, who is driving the automobile, intends to charge a mobile phone in a wireless manner, the driver places the mobile phone roughly on a wireless charging site of the automobile and the magnetic unit 20 may automatically rotate to effect positioning through magnetic attraction or the magnetic unit 20 may automatically move the transmission coil 12 of the wireless transmission module 11 to a designated location, this allowing the driver not to remove his or her eyesight from driving and not to reduce the concentration for driving thereby satisfying the need for safety driving).

Figure 10:
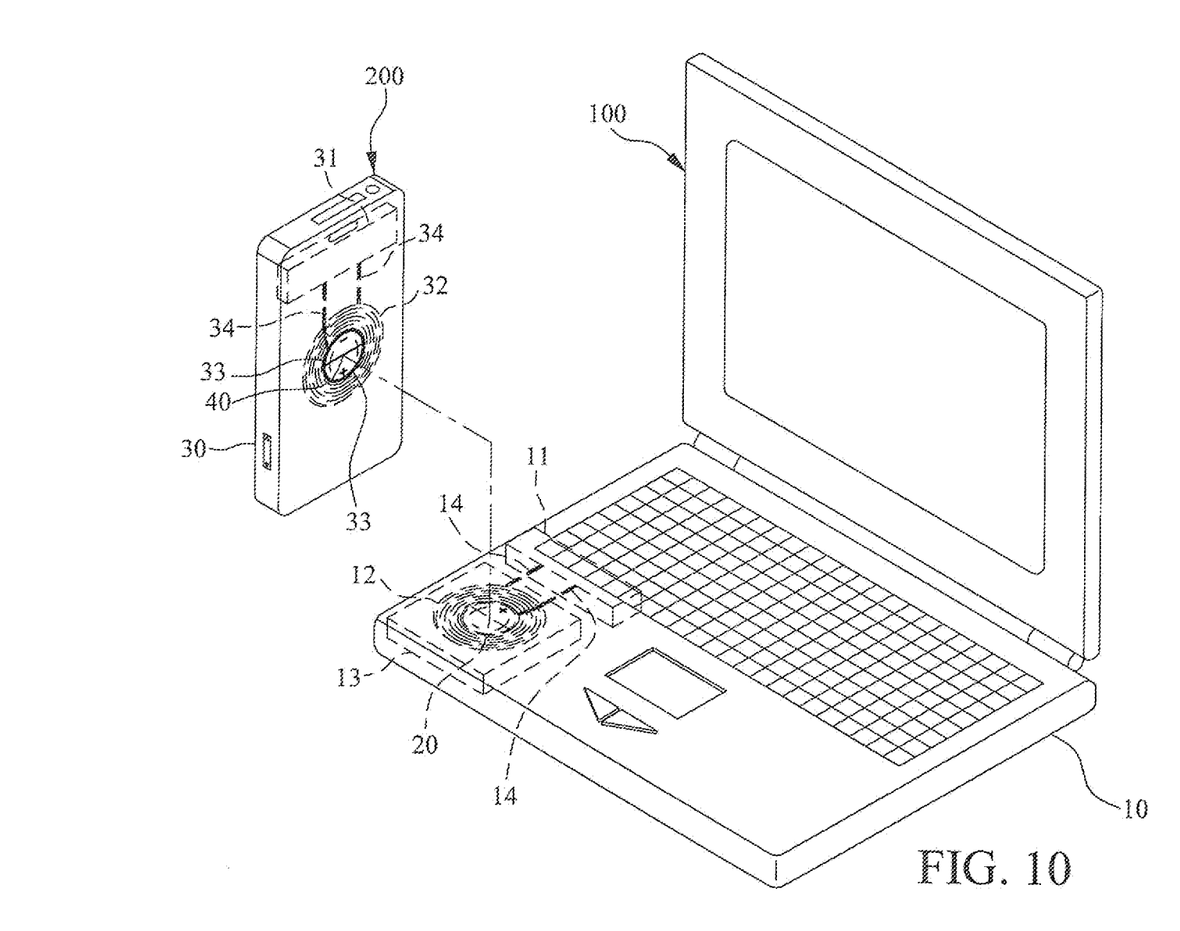
FIG. 10 is a schematic view showing a device body according to the present invention having a top side in which a receiving section, a magnetic unit, and a transmission coil are arranged for use in combination with another electronic device.

Further, as shown in FIG. 10, the electronic device 100 is a notebook computer (or a tablet computer), and another electronic device 200 is a mobile phone (which can be the one illustrated in the right-hand side portion of FIG. 2). The electronic device 100 comprises a receiving section 13 formed in a top side (the keyboard side) of the device body 10 thereof. The magnetic unit 20 (two magnetic attraction elements) is set in the transmission coil 12 and is movable within the receiving section 13. As such, when said another electronic device 200 is positioned on the side of the device body 10 and located above the receiving section 13, there is no need to exercise care for precise alignment of the magnetic attraction units 20, 40 of the two electronic devices 100, 200 and the magnetic unit 20 of the receiving section 13 will be affected by the magnetic attraction to automatically move the transmission coil 12 to a designated position where the two magnetic attraction units 20, 40 attract each other and the two transmission coils 12, 32 properly align with each other to facilitate wireless transmission of electrical power.

Figure 11:
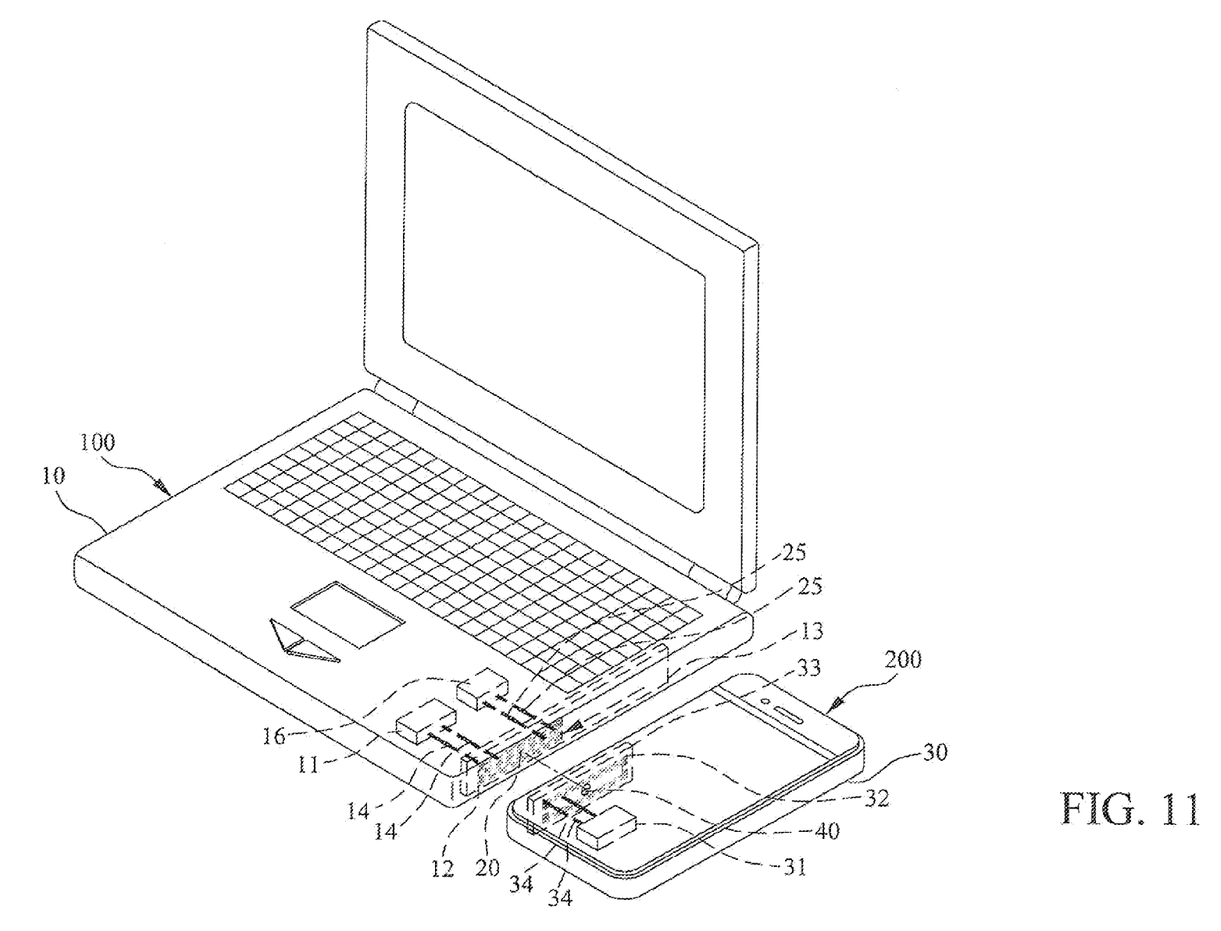
FIG. 11 is a schematic view showing a device body according to the present invention comprising a lateral side in which a receiving section, a magnetic unit, and a transmission coil are arranged for use in combination with another electronic device.

When an ordinary user is operating keys (or touch interface) of the notebook computer (the electronic device 100), the user will place his or her mobile phone (the electronic device 200) beside the notebook computer. Thus, as shown in FIG. 11, the present invention arranges the receiving section 13, the magnetic unit 20 (the magnetism conduction member and the electromagnetic coil), and the transmission coil 12 one a side surface of the device body 10 and also arranges the transmission coil 32 on a corresponding side face of the device body 30 of another electronic device 200 with the transmission coil 32 being fixed in the magnetic unit 40. As such, when the device bodies 10, 30 of the two electronic devices 100, 200 are placed to face each other, there is no special care to be excised to precisely align the two magnetic attraction units 20, 40 with respect to each other. When the magnetic attraction unit 20 of the receiving section 13 of the device body 10 receives electrical power supplied from the power supply 16, magnetic attraction is generated to attract the magnetic unit 40 of another device body 30. Then, the magnetic attraction units 20 will automatically move the transmission coil 12 to a designated location for alignment so that the two magnetic attraction units 20, 40 attract and are attached to each other with the two transmission coils 12, 32 aligning with each other to facilitate wireless transmission of electrical power.

In summary, the present invention provides an electronic device with automatic positioning function that has the following features:

(1) By providing a receiving section 13 in the device body 10 and providing a movement distance D for relative movement, besides the functions of protection and aesthetics, movement of the transmission coil 12 that carries the wireless transmission module 11 to a designated location can be automatically effected through the characteristics of the magnetic units 20 that identical polarities expel each other and opposite polarities attract each other. Further, the magnetic unit 20 is arranged as a structure that is free to rotate so that there is no need to exercise special care to have two electronic devices precisely aligning each other and there is also no need to place one of the two electronic devices, making the use easy and convenient.

(2) By arranging the magnetic unit 20 in a structure that can switch magnetic polarity by varying the flowing direction of electrical current, the structure for positioning through attraction can be realized.

(3) By arranging each of the first and second conductive wires 14, 25 in the form of twisting multiple strands of threads 141, 251, the structural strength thereof can be improved to provide an effectiveness of resisting stretching.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electronic device with automatic positioning function, comprising:
    a device body, which comprises a wireless transmission module for transmitting wirelessly electrical power, the wireless transmission module comprising a transmission coil, the device body having one side that comprises a receiving section;
    a magnetic unit, which is set in center of the transmission coil; and
    a disk, which is movably received in the receiving section of the device body and an outer circumference of which is spaced from an inner circumference of the receiving section by a spacing distance, the disk having a surface forming a central receiving chamber and a circumferential receiving chamber that circumferentially surrounds the central receiving chamber, the central receiving chamber receiving the magnetic unit, the circumferential receiving chamber receiving the transmission coil;
    wherein when a device body of the other one electronic device is positioned on the device body of the electronic device, the magnetic unit received in the receiving section of the device body of the electronic device induces magnetic attraction with respect to a magnetic unit of the other one electronic device to cause the magnetic unit of the electronic device to automatically carry the transmission coil and the disk of the electronic device to move in unison from a first position where the disk locates in the receiving section to a second position in the receiving section so as to have the transmission coil of the wireless transmission modules of the two electronic devices precisely aligned with respect to each other;
    wherein the second position aligns with respect to the position where the magnetic unit of the other one electronic device locates.

2. The electronic device with automatic positioning function as claimed in claim 1, wherein the wireless transmission module and the transmission coil are connected to each other by at least two first conductive wires, each of the first conductive wires being formed by twisting multiple strands of threads.

3. The electronic device with automatic positioning function as claimed in claim 1, wherein the disk has an opposite surface on which a plurality of spot bumps is formed, the spot bumps providing slidable engagement with a surface of the receiving section.

4. The electronic device with automatic positioning function as claimed in claim 1, wherein the magnetic unit comprises a first magnetic attraction element having positive polarity facing outward and a second magnetic attraction element having negative polarity facing outward, the first and second magnetic attraction elements being laid flat and jointed to each other to form a shape of disk, the magnetic unit being rotatably received in the central receiving chamber of the disk.

5. The electronic device with automatic positioning function as claimed in claim 4, wherein the central receiving chamber of the disk comprises an annulus of projecting flange along a circumference thereof, the projecting flange constraining the magnetic unit within the central receiving chamber.

6. The electronic device with automatic positioning function as claimed in claim 4, wherein a rotatable rotation shaft is arranged in the central receiving chamber of the disk and fixedly fit into a center of the magnetic unit.

7. The electronic device with automatic positioning function as claimed in claim 6, wherein a bearing fits in the central receiving chamber of the disk therein, an end of the rotation shaft being fixedly fit into the bearing for free rotation, an opposite end of the rotation shaft being fixedly fit into the center of the magnetic unit.

8. The electronic device with automatic positioning function as claimed in claim 4, wherein the central receiving chamber of the disk comprises a vertically extending raised post, the center of the magnetic unit being provided with a bearing, the bearing being fit over the raised post.

9. The electronic device with automatic positioning function as claimed in claim 1, wherein the magnetic unit comprises a magnetism conduction member and an electromagnetic coil, the electromagnetic coil being wound around the magnetism conduction member and being fixed together in the central receiving chamber of the disk.

10. The electronic device with automatic positioning function as claimed in claim 9, wherein the electromagnetic coil is connected to two second conductive wires, each of the second conductive wires being formed by twisting multiple strands of threads.

\* \* \* \* \*